United States Patent [19]

Filip et al.

[11] 4,122,047

[45] Oct. 24, 1978

[54] PRODUCTION OF POLYESTER FOAM

[75] Inventors: Stanislaw Franz Filip; Alexander Miutel, both of Toronto, Canada

[73] Assignees: Isaac Meisels; Stanislaw F. Filip; Alexander Miutel, all of Toronto, Canada

[21] Appl. No.: 784,708

[22] Filed: Apr. 5, 1977

[30] Foreign Application Priority Data

Mar. 4, 1977 [GB] United Kingdom ............... 9339/77

[51] Int. Cl.² .............................................. C08J 9/08
[52] U.S. Cl. .................................. 521/106; 521/119; 521/123; 521/138; 521/917; 422/133; 260/40 R; 264/DIG. 5; 264/54; 264/DIG. 18; 264/213; 264/259; 264/267; 264/271
[58] Field of Search .................................... 260/2.5 N

[56] References Cited

U.S. PATENT DOCUMENTS

| | | | |
|---|---|---|---|
| 3,362,919 | 1/1968 | Rood | 260/2.5 N |
| 3,574,646 | 4/1971 | Wismer et al. | 260/2.5 N |
| 4,028,289 | 6/1977 | Brown | 260/2.5 N |

*Primary Examiner*—Morton Foelak
*Attorney, Agent, or Firm*—Sim & McBurney

[57] ABSTRACT

Polyester foam is formed by simultaneously cross-linking an unsaturated polyester resin and generating carbon dioxide as a blowing agent. The foam-forming components are divided into two equal volume parts which are metered together to effect the simultaneous reactions and form the foam. Apparatus is described for effecting the foam-forming method.

7 Claims, 1 Drawing Figure

PRODUCTION OF POLYESTER FOAM

FIELD OF INVENTION

The present invention is directed to methods and apparatus for the formation of a foam of a thermosetting material.

BACKGROUND OF THE INVENTION

Foams of polyester resins have been formed by first producing an emulsion of water and polyester resin and then adding blowing agents to the emulsion in the form of bicarbonates. The emulsion formation is considered necessary to enable rapid dispersion of the blowing agent through the resin before the blowing reaction or resin curing have advanced too far.

The foams which are produced by the latter procedure have an open cell structure to enable them to be dried for removal of excess water remaining after foaming. The water also has an adverse affect on the foam-forming reaction, lowering the peak temperature, the foam strength and impact resistance.

For these reasons, polyester foams have not achieved widespread commercial use, and the principal use of polyester resins in structural work has been in glass fiber laminates made up of successive cured layers which are built up to provide stiffness and bending resistance.

SUMMARY OF INVENTION

The present invention is directed to methods and apparatus for the production of polyester foam or foam of other unsaturated water-immiscible resins. The foams are rigid in character and are comprised of a majority of uniformly-sized closed cells. The foams often exhibit high compressive strength, resulting in excellent utility in structural items.

Polyester foams are superior to polyurethane foams in that they are cheaper to produce and no noxious gases are produced on burning, in contrast to the case of polyurethane.

In this invention, resin foams are formed by the cross-linking of an unsaturated water-immiscible resin using a suitable cross-linking monomer while carbon dioxide is simultaneously generated as a foam blowing agent.

In this invention, the foam forming components are divided into two separate mixtures and the simultaneous reactions are effected by bringing the mixture parts together in controlled manner.

GENERAL DESCRIPTION OF INVENTION

The unsaturated water-immiscible resin preferably is an unsaturated polyester resin. Any convenient cross-linking monomer, such as, styrene, may be used. Some mixtures of unsaturated polyester resins with cross-linking monomer are commercially-available and are characterized by the properties:

Brookfield viscosity (at 25° C) 2000 to 3000 cps
Acid value — 25 to 35
Monomer content — 25 to 30 wt. %

Curing agents are required to initiate cross-linking of the unsaturated resin and, in this invention, the curing agent is a free radical-producing mixture of a catalyst or hardener, such as, benzoyl peroxide, and an accelerator or promoter, such as, dimethylaniline.

The blowing agents used to form the foam consist of a carbonate component, such as finely divided calcium carbonate or sodium bicarbonate, and an acid component, such as, phosphoric acid or mixture of hydrochloric and orthophosphoric acids. These components react together in the foam-forming reaction mixture to produce carbon dioxide, which causes the foaming.

In accordance with this invention, the initial reactants are divided into two separate mixtures which are brought together when the formation of the foam is desired. In one of the mixtures, there is provided a portion of a mixture of unsaturated resin cross-linking monomer, the carbonate component and the catalyst promoter and, in the other of the mixtures, there is provided the remainder of the unsaturated resin and cross-linking monomer, the acid component and the cross-linking catalyst. The latter mixture is formed into a stable emulsion. Since the resins are self-emulsifiers, an additional emulsifying agent is not required.

By providing each of the mixtures in an initially well blended form, the reactive materials may be readily thoroughly intermixed and blended to achieve uniform curing and foam formation throughout the mixture.

Other components may also be present in one or the other of the mixtures, such as, plasticizers, nucleation agents, for example, silica gel "Q-cell" (i.e., hollow silica beads), talc, or barium metaborate. The latter material also acts as a fungicide and an auxiliary fire retardant. Other auxiliary fire retardants are antimony trioxide and molybdenum oxide.

Fire retardant resins also may be included as part of the resin component to impart good fire retardant properties to the foam.

In the preferred embodiment of the invention, the components are separated into two substantially equal volume mixtures which are brought together and inter-mixed in controlled manner to form the foam at ambient temperatures (20° to 25° C).

Foamed structures produced by the procedure of this invention and intended for use as structural elements may have screw-threaded openings provided therein by the utilization of a unique procedure.

In the latter procedure, a hole is drilled to the desired depth in the foamed structural element and of diameter greater than the diameter of the screw-threaded opening to be formed in the element.

An element having outer screw threads of the desired dimension and pitch has a lubricant applied to the surface thereof and is suspended substantially centrally of the hole formed in the element. The hole then is filled with a curable resin mixture which flows into the hole and into the surrounding cells. After curing of the resin, the screw-threaded element is removed leaving the desired screw-threaded opening in the element.

The flowing of the resin into the cell structure surrounding the hole and the curing of the resin therein results in a very strong interconnection between the cured resin plug and the surrounding foam. The resin mixture which is used in this embodiment of the invention comprises a cross-linkable resin, a cross-linking monomer, a cross-linking catalyst and an initiator. The viscosity of the resin is modified by the inclusion of desired quantities of fillers.

BRIEF DESCRIPTION OF DRAWING

The sole FIGURE of the accompanying drawing is a flow sheet illustrating one embodiment of the invention.

DESCRIPTION OF PREFERRED EMBODIMENT

Figure 1:
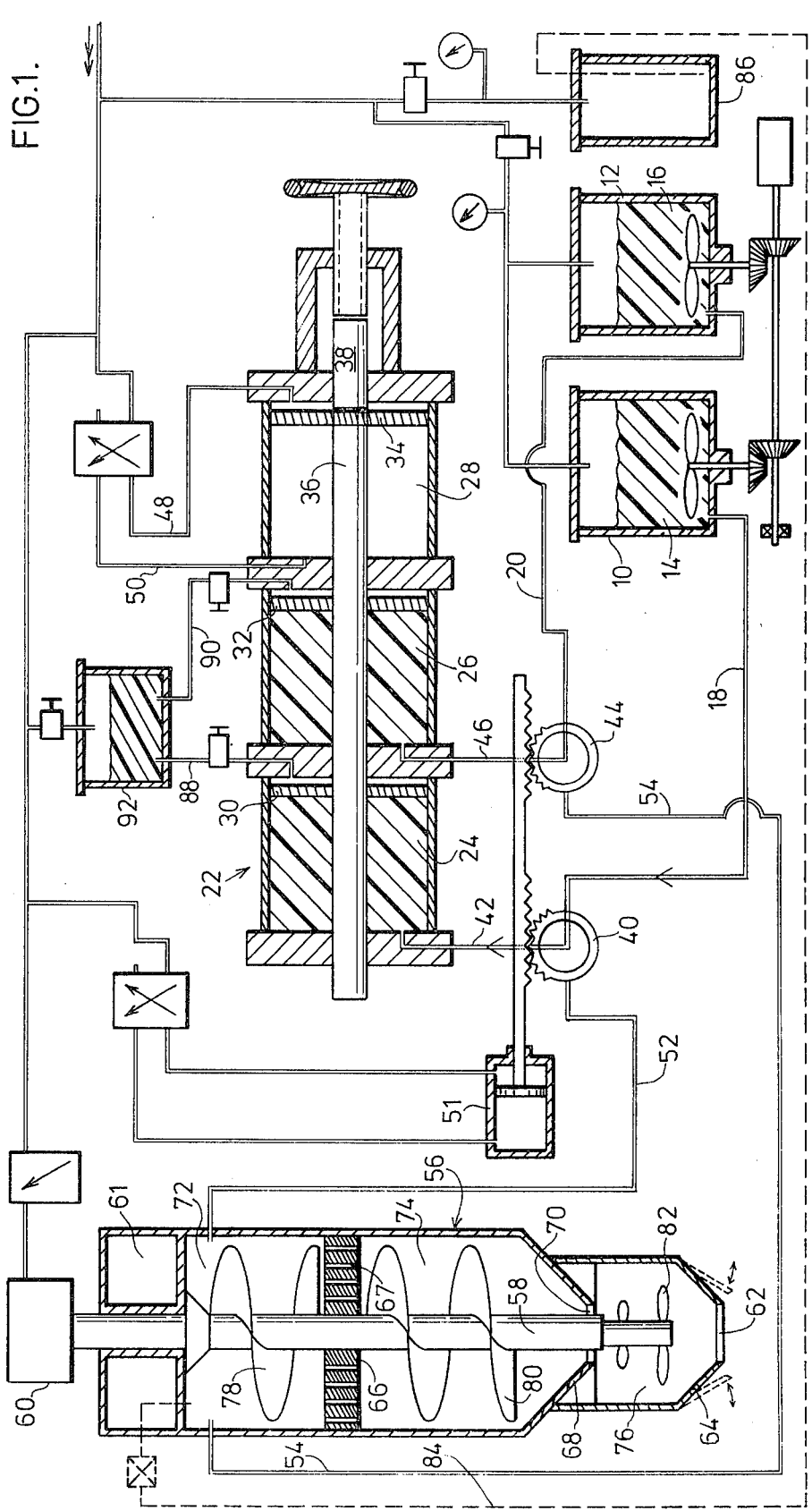

Referring to the drawings, two storge tanks 10 and 12 contain resin mixtures 14 and 16, one of which contains unsaturated polyester resin, cross-linking monomer, sodium bicarbonate and catalyst promoter, along with other additives, if present, and the other of which contains an emulsion of unsaturated polyester resin, cross-linking monomer, acid and cross-linking initiating catalyst. The mixtures are maintained in agitation in the storage tanks to keep the components of each mixture uniformly blended.

The storage tanks 10 and 12 are connected partly through lines 18 and 20 respectively to a substantially cylindrical metering valve 22 consists of three chambers 24, 26 and 28 of substantially equal volume and isolated one from another by suitable bulkheads. A disc-like piston 30, 32, and 34 is mounted in each of the chambers and each piston is of substantially the same diameter as the respective chamber. The piston 30, 32 and 34 are connected by an axial rod 36 for ganged reciprocal movement in the chambers.

A manually-adjustable stop device 38 is provided at one end of the metering valve 32 to limit the stroke of the pistons 30, 32 and 34 and thereby limit the volume of material to be received in and expelled from the valve 22.

The chamber 24 is connected to the feed line 18 through a two-way valve 40 and line 42 while the chamber 26 is connected to feed line 20 through a second two-way valve 44 and line 46. The chamber 28 is connected on both sides of the piston 34 to a compressed air feed by lines 48 and 50.

The metering valve 22 usually is horizontally oriented for ease of operation. The valve 22 may, however, be given any convenient orientation.

The two-way valves 40 and 44 are connected for operation and switching in unison by an air-operated piston 51 and selectively connect the lines 42 and 46 either to the feed lines 18 and 20 or output lines 52 and 54.

The output lines 52 and 54 are connected to a generally hollow cylindrical mixing valve 56. The mixing valve 56 is vertically aligned and constructed to mix the components fed thereto by lines 52 and 54.

The mixing valve 56 has a rotatable shaft 58 extending axially of the valve 56 and the shaft 58 is driven by an air-operated motor or any other convenient drive means. The valve 56 is closed at the upper end by a suitable closure 61 and open at its lower end, the diameter of the ofifice 62 being adjustable by suitable manipulation of the end plates 64.

Upper and lower stationary baffles are located internally of the mixing valve 56. The upper baffle 66 is in the form of a disc having a plurality of axial flow passages 67 therethrough for the passage of mixed material therethrough. The lower baffle 68 is a downwardly-sloping solid conical member terminating in an orifice 70 through which material may pass axially.

The upper baffle 66 defines an upper mixing chamber 72 with the top closure 61 while the lower baffle 68 defines an intermediate chamber 74 with the upper baffle 66. A third chamber 76 is provided between the lower baffle 68 and the exit orifice 62.

A first screw mixing element 78 is fixedly mounted on the shaft 58 for rotation therewith in the upper mixing chamber 72 while a second screw mixing element 80 is fixedly mounted on the shaft 58 for rotation therewith in the intermediate chamber 74. At the lower end of the shaft 58 and located in the lower chamber 76 is fixedly mounted one or more impeller blades 82.

An additional line 84 is connected to the valve 56 for the passage of cleaning liquid therethrough from a storage tank 86 when the valve 56 is not in use.

The chambers 24 and 26 are connected by lines 88 and 90 through suitable valves to a storage tank 92 on the opposite side of the pistons 30 and 32 from the connection with lines 42 and 46. The storage tank 92 has resin diluted with monomer contained therein. The diluted resin is used to wash the interior walls of each of the chambers 24 and 26 when the metering valve 22 is not in use, so as to prevent evaporation of volatiles and the build up of solids on the inside of the chambers during downtime.

OPERATION

In operation, the pistons 30, 32 and 34 in the metering valve 22 are initially located at the left-hand side of the chambers 24, 26 and 28 as viewed in the drawing, and the valves 40 and 44 are located in the positions seen in the drawing.

Compressed air then is passed through line 50 while line 48 is open to atmosphere, causing the piston 34 and consequently the piston 30 and 32 to move to the right. The combined action of this rightward movement of the pistons 30 and 32 and of compressed air on the mixtures 14 and 16 in the storage tanks 10 and 12 causes mixture to flow into each of the chambers 24 and 26 until the desired volume, determined by the position of the stop 38, has been fed into the chambers 24 and 26. Since the portions of the chambers 24 and 26 to the left of the pistons 30 and 32 are of equal volume, irrespective of the positions of the pistons 30 and 32, the volume of material present in each chamber 24 and 26 is the same, irrespective of the position of the stop 38.

Once the desired volume of material is present in each of the chambers 24 and 26, the valves 40 and 44 switch to the connection between lines 42 and 52 and lines 46 and 54, i.e., as shown in inset AA, and the compressed air feed in line 50 is switched to line 48, line 50 being opened to atmosphere.

The action of the compressed air on the right-hand side of the piston 34, as viewed in the drawing, causes material to be expelled from the chambers 24 and 26 and through lines 52 and 54 to the mixing valve 56.

As the metered flow of material enters the first mixing chamber 72, it is taken up by the threads of the screw mixer 78, mixed and passed downwardly. In this way, the metered individually-small quantities of material entering by lines 52 and 54 are thoroughly intermixed, ensuring an overall uniformity of mixing.

The intermixed material passes through the passages 67 in the baffle 66 creating a back pressure which assists in ensuring uniformity of the mixing. The cross-linking and foam-forming reactions are initiated by the mixing of the metered flow.

After passage through the passages 67, the material is conveyed by the screw 80 to the orifice 70 causing a pressure drop which assists in the flow of the mixture through the passage 67 and through chamber 74. Finally, the material passes through chambers 76 with the combined effect of the impeller 82 and the size of the orifice 62 causing further intermixing to ensure uniformity of cell distribution in the finalr product.

The forming and cross-linking mixture is discharged from the orifice 62 into a mold or onto a substrate for rapid completion of the foaming and cross-linking reactions.

EXAMPLES

The invention is illustrated by the following Examples which were carried out in the apparatus shown in the drawing:

EXAMPLE 1

A plurality of reactants were formed into two separate mixtures A and B as set forth in the following Table I:

TABLE I

| Component | Total pts. by wt. | Mixtures A pts by wt. | Mixtures B pts by wt. |
|---|---|---|---|
| Unsaturated polyester resin containing styrene monomer[1] | 100 | 42.5 | 57.5 |
| Benzoyl peroxide (50% paste in tricresyl phosphate) | 5.0 | 5.0 | — |
| Sodium bicarbonate | 10.0 | — | 10.0 |
| Q-cell[2] | 1.75 | 1.75 | — |
| Antimony trioxide[3] | 5.0 | — | 5.0 |
| Dimethyl aniline | 0.4 | — | 0.4 |
| 30% aq. sol. of $H_3PO_4$ | 11.8 | 11.8 | — |
| Totals | 133.95 | 61.05 | 72.9 |

Notes: [1] The resin was Ashland 1003 having the following typical properties:
Brookfield viscosity at 25° C    2000 to 2600 cps
Acid value    25 to 30
Styrene content    26%
[2] Q-cell is a nucleation agent
[3] Antimony trioxide is added as a fire retardant The mixtures A and B were thoroughly intermixed at about 23° C and a foam was rapidly formed, foam growth being 5 times the resin volume and being effected in about 6.5 minutes and resin gellation occuring in about 7.0 minutes. The resultant very strong uniformly small-celled foam had a foam density of 0.28g/cm³ and a compressive strength of 13.5 kg/cm² (194 psi).

EXAMPLE 2

A plurality of reactants were formulated into two different separate mixtures A and B as set forth in the following Table II:

TABLE II

| Component | Total pts. by wt. | Mixtures A pts by wt. | Mixtures B pts by wt. |
|---|---|---|---|
| Unsaturated polyester resin containing styrene monomer[1] | 100 | 40 | 60 |
| Benzoyl peroxide | 5.0 | 5.0 | — |
| Sodium bicarbonate | 14.5 | — | 14.5 |
| Q-cell[2] | 2.0 | 2.0 | — |
| Barium metaborate[3] | 4.5 | — | 4.5 |
| Dimethyl aniline | 0.25 | — | 0.25 |
| 30% aq. sol. of $H_3PO_4$ | 17.11 | 17.11 | — |
| Totals | 143.36 | 64.11 | 79.25 |

Notes:
[1] The resin is Ashland 1003.
[2] Q-cell is a nucleation agent
[3] Barium metaborate is present as a nucleation agent and fungicide The mixtures A and B were rapidly mixed together at about 25° C and formed a uniform very small celled foam at an expansion of 15 times the resin volume. The foam growth time was 3 minutes 10 seconds while the gel time was 3 minutes 20 seconds. The foams had a density of 0.1g/cm³ and a compressive strength of 4.2kg/cm² (60 psi).

EXAMPLE 3

Two separate reaction mixtures A and B were again made up in this case a fire resistent halogenated resin was present in the formulation. The components and their proportions are set forth in the following Table III:

TABLE III

| Component | Total pts by wt. | Mixtures A pts by wt. | Mixtures B pts by wt. |
|---|---|---|---|
| Unsaturated polyester resin containing styrene monomer[1] | 62.5 | 26.56 | 35.94 |
| Halogenated polyester resin[2] | 37.5 | 15.93 | 21.57 |
| Benzoyl peroxide | 5.0 | 5.0 | — |
| Sodium bicarbonate | 12.0 | — | 12.0 |
| Q-cell | 2.0 | 2.0 | — |
| Antimony trioxide | 7.5 | — | 7.5 |
| Dimethyl aniline | 0.5 | — | 0.5 |
| 30% aq. sol. $H_3PO_4$ | 14.45 | 14.45 | — |
| Totals | 141.45 | 63.94 | 77.51 |

Notes: [1] The resin is Ashland 1003
[2] The resin is Hooker Hetron-92 having the following typical properties:

Brookfield Viscosity (no. 3 spindle) at 25° C    1900 to 2500 cps
Acid value    31 to 37
Monomer content    26 to 30 wt%
Specific gravity    1.35 to 3.45 g/cm³

The mixtures A and b were mixed quickly at 24° C and a foam of 12.5 times expansion based on resin volume was formed in a foam growth time of 2 minutes 45 seconds and a gel time of 3 minutes. The foam was uniform and possessed medium sized cells. The foam had a density of 0.13g/cm³, a compressive strength of 5.6 kg/cm² (80 psi) and a self-extinguishing time of less than 1 second.

EXAMPLE 4

Holes ⅜ inch in diameter and inches in depth were drilled in a piece of foam formed by the procedure of Example 1 and having a foam expansion of about 10. A silicone rubber lubricant was applied to the surface of ¼-diameter wood screws and a screw was suspended in each hole.

A mixture of components of the following formulation was inserted in each hole and cured:

| | |
|---|---|
| Polyester resin[1] | 100.00 parts by wt. |
| Cobalt naphthenate[2] | 0.1 to 2 parts by wt. |
| Magnesium silicate[3] | 30.0 to 40.0 parts by weight |
| Silica gel[4] | up to 1.0 parts by wt. |
| Methyl ethyl ketone peroxide[5] | 0.5 to 1.0 parts by wt. |

Notes:
[1] The polyester resin is one formed from maleic anhydride, phthalic anhydride, propylene glycol and ethylene glycol containing 30 to 40 wt% of styrene as crosslinking monomer and of viscosity 400 to 1000 cps and an acid value of 30 to 40.
[2] Used as promoter
[3] Filler for improving strength and other physical properties
[4] Filler for increasing viscosity and altering thixotropic properties of the uncured product
[5] Used as catalyst After the curing operation was complete, an average weight of 680 lb was applied to each screw before the joint fractured. The screw was easily removed from the cured resin.

SUMMARY

The present invention, therefore, provides a convenient procedure for the formation of polyester foams. Modifications are possible within the scope of the invention.

What we claim is:

1. A method for forming a foam of a cross-linkable unsaturated water immiscible polyester resin, which comprises forming a first reaction mixture containing part of said resin, a cross-linking monomer for the resin, a carbonate material which will release carbon dioxide when contacted by acid and selected from calcium carbonate and sodium bicarbonate and a catalyst promoter for a cross-linking initiating catalyst, forming a second reaction mixture containing the remainder of said resin, a cross-linking monomer for the resin, an acid capable of reacting with said carbonate to form carbon dioxide and selected from phosphoric acid, hydrochloric acid and mixtures thereof and a cross-linking initiating catalyst which is activatable by said catalyst promoter, said resin and said cross-linkable monomer being used as a mixture characterized by the properties:

| Brookfield viscosity (at 25° C) | about 2000 to about 3000 cps |
|---|---|
| Acid value | about 25 to about 35 |
| Monomer content | about 25 to about 30 wt %, | and wherein said first and second reaction mixtures have substantially the same volume, and blending said first and second reaction mixtures simultaneously to cross-link said resin with said cross-linking monomer to a cured form and generate carbon dioxide as a blowing agent by reaction between said carbonate and said acid.

2. The method of claim 1 wherein the cross-linking monomer is styrene.

3. The method of claim 1 wherein said cross-linking initiating catalyst is benzoyl peroxide and said promoter is dimethylaniline.

4. The method of claim 1 wherein said first mixture further contains resin property modifying agents, such as plasticizers, nucleation agents, fungicides and auxiliary fire retardants.

5. The method of claim 1 wherein said first and second reaction mixtures also contain a cross-linkable halogenated resin to impart fire retardant properties to the foam.

6. The method of claim 1 wherein said blending of said first and second reaction mixtures is achieved by intermixing successive incremental amounts of said first and second reaction mixtures.

7. The method of claim 1 including forming at least one opening in the cured foam, inserting a screw-thread former in said opening, curing resin in said opening and removing said former from the cured resin.

* * * * *